United States Patent [19]

Cunningham

[11] 4,039,016

[45] Aug. 2, 1977

[54] TIRE SERVICING APPARATUS

[75] Inventor: Charles L. Cunningham, Nashville, Tenn.

[73] Assignee: The Coats Company, Inc., La Vergne, Tenn.

[21] Appl. No.: 703,681

[22] Filed: July 8, 1976

[51] Int. Cl.² .......................................... B60C 25/06
[52] U.S. Cl. .................................................. 157/1.28
[58] Field of Search ................ 92/128, 258; 157/1.17, 157/1.24, 1.28

[56] References Cited

U.S. PATENT DOCUMENTS

| | | | |
|---|---|---|---|
| 3,255,800 | 6/1966 | Strang et al. | 157/1.24 |
| 3,398,777 | 8/1968 | Strang | 157/1.28 |
| 3,474,710 | 10/1969 | Stryker | 92/128 |
| 3,643,551 | 2/1972 | Berg | 92/128 |

*Primary Examiner*—Al Lawrence Smith
*Assistant Examiner*—James G. Smith

*Attorney, Agent, or Firm*—Wegner, Stellman, McCord, Wiles & Wood

[57] ABSTRACT

A tire changing device including a stand having a wheel receiving surface for receiving and holding a wheel to permit a tire servicing operation to be performed on a tire on the wheel, a bead breaker assembly mounted for movement on the stand toward and away from the wheel receiving surface for breaking the bead of a tire, and a fluid motor interconnecting the stand and the bead breaker for moving the bead breaker toward the wheel receiving surface, the motor including a cylinder having a closed end with a bore in the closed end, the cylinder being partially closed at its opposite end while being open across at least one diameter, a rod extending through the bore, a piston removably secured to the rod within the cylinder, and a closing member for the partially closed end removably received therein. Both the piston and the closing member are removable through the partially closed end to facilitate servicing.

8 Claims, 5 Drawing Figures

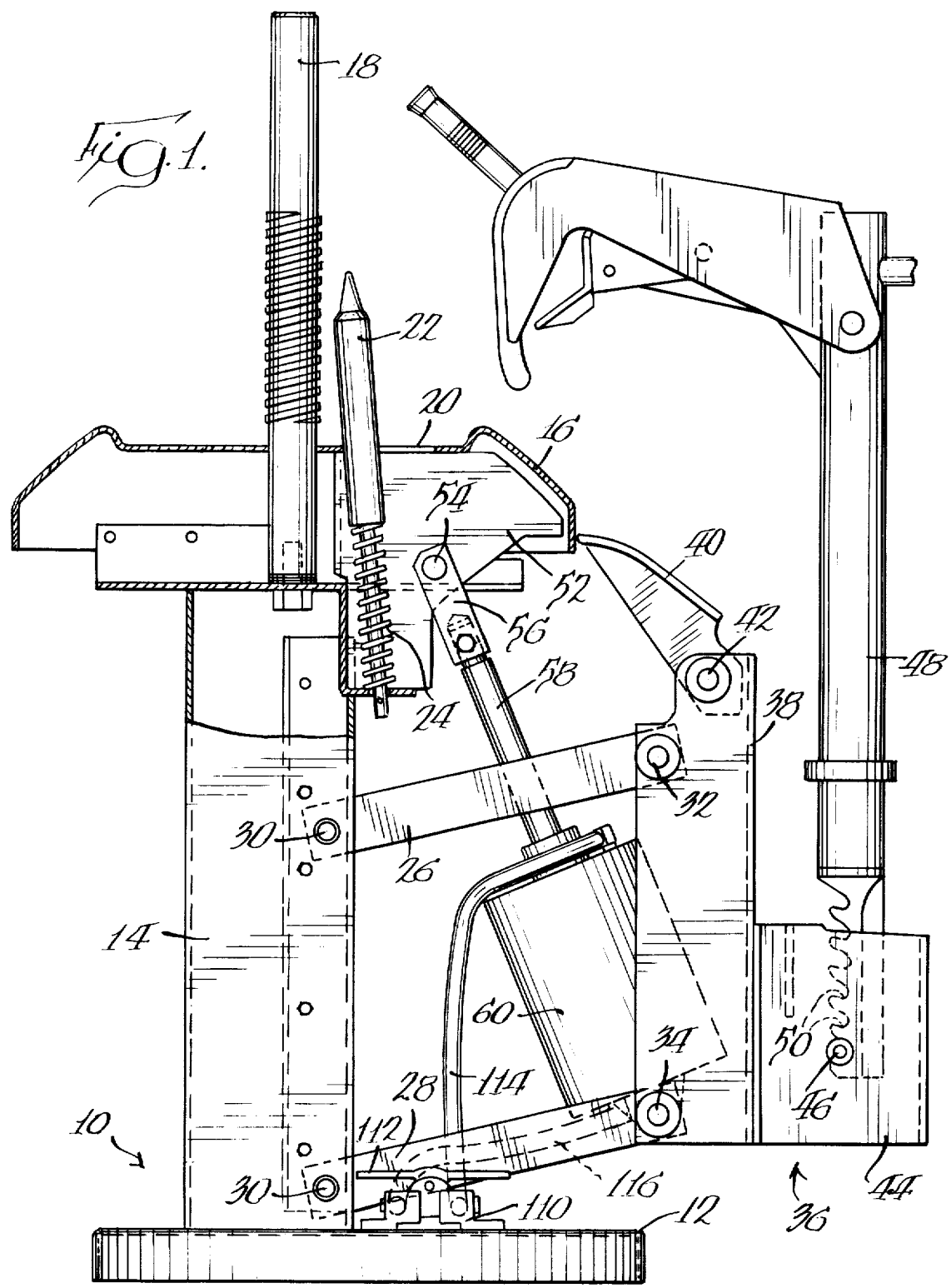

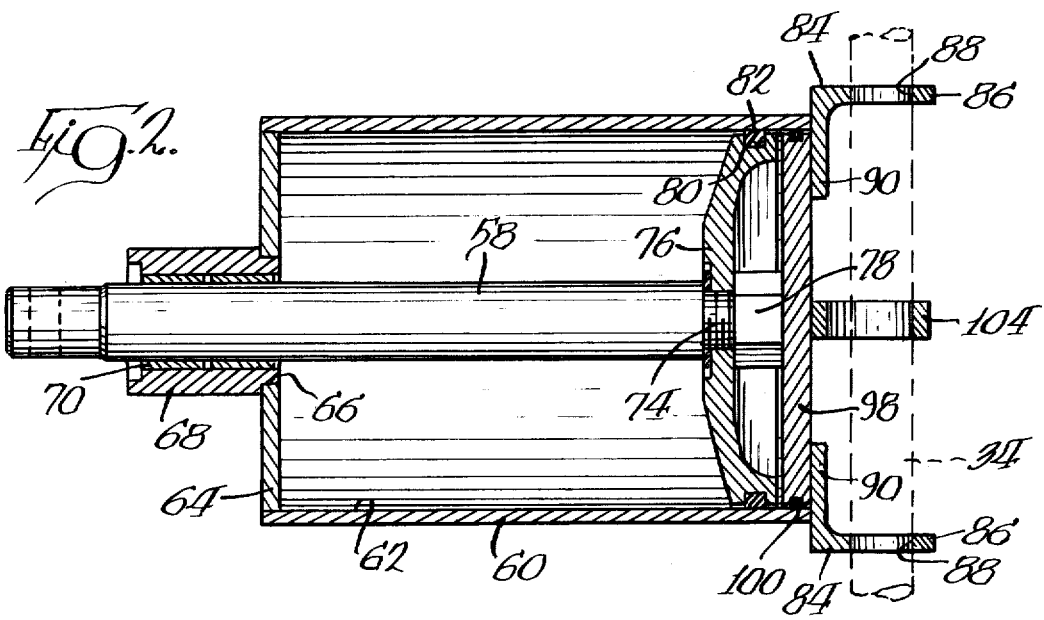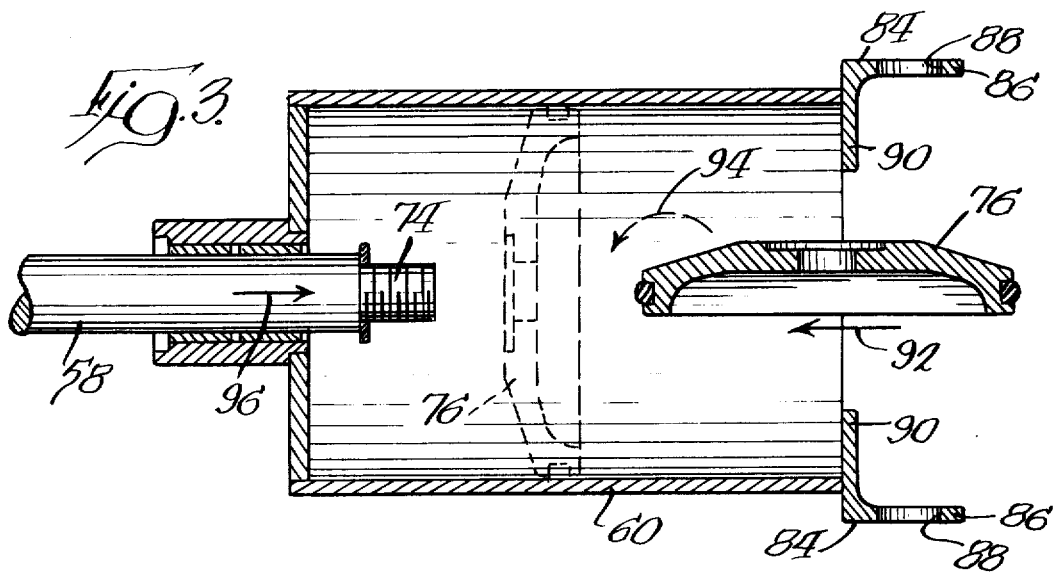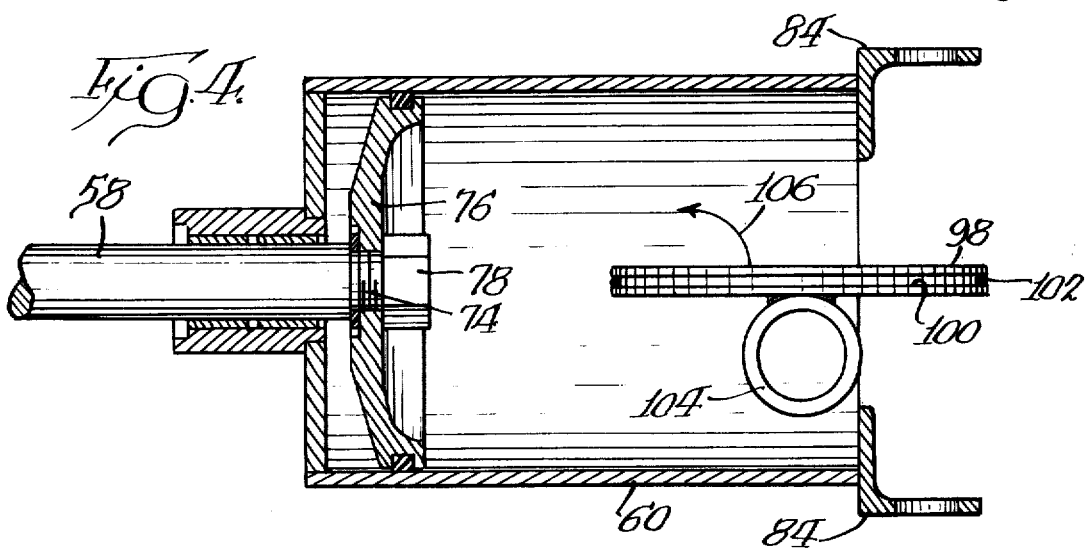

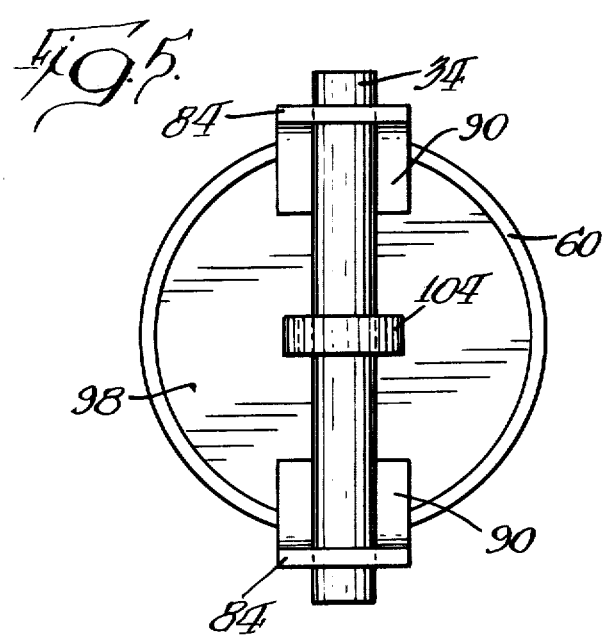

TIRE SERVICING APPARATUS

BACKGROUND OF THE INVENTION

This invention relates to tire servicing apparatus.

Many types of tire servicing apparatus in use today utilize fluid motors for moving apparatus elements relative to others during the course of a tire servicing operation period. In general, reciprocating air motors are used by reason of the fact that most locations utilizing tire servicing apparatus have a source of air under pressure at the location necessary for the inflation of tires.

While such reciprocating air motors have performed satisfactorily in tire servicing apparatus, somewhat frequent servicing may be required due to mishandling of the servicing apparatus by relatively unskilled labor and/or degeneration of seals and packing due to prolonged exposure to pressurized air which has not been properly filtered, dehumidified, etc.

Heretofore, the servicing of such reciprocating motors has been difficult and time consuming by reason of their relatively complicated construction and/or occasion in the servicing apparatus and connection thereto.

SUMMARY OF THE INVENTION

It is the principal object of the invention to provide a new and improved tire servicing apparatus of the type embodying a reciprocating air motor. More specifically, it is an object of the invention to provide such an apparatus wherein the air motor may be easily serviced without requiring elaborate disassembly of the apparatus or the cylinder itself.

An exemplary embodiment of the invention achieves the foregoing objects in a tire changing apparatus of the type including a base provided with wheel receiving means thereon. Tire servicing means are movable on the base for performing a desired function and a tire servicing operation and a fluid motor is disposed on the base for driving the tire servicing means. The fluid motor includes a cylinder having a partial opening at one end of substantial width and of a length equal to its internal diameter. A piston is disposed within the cylinder and is removable through the opening. A closure is located within the cylinder and it is also removable through the opening. Thus, seals on the piston or the piston itself may be easily serviced.

In one embodiment of the invention, the tire servicing apparatus is a tire changing apparatus and the tire servicing means comprise a bead breaker assembly.

Preferably, the closure member for the opening in the cylinder comprises a circular plate provided with a peripheral seal.

In a highly preferred embodiment, the partially open end of the cylinder is partially closed by opposed elements defining pivots which have parts extending radially inwardly of the partially open end. The pivots are advantageously applied to pivotally connect the cylinder to the apparatus. In one embodiment, the closure is provided with a retaining ring extending from one side thereof and the ring is impaled by a pivot pin extending between the pivots thereby preventing substantial movement of the closure within the cylinder.

Other objects and advantages will become apparent from the following specification taken in conjunction with the accompanying drawings.

DESCRIPTION OF THE DRAWINGS

FIG. 1 is a side elevation of tire servicing appartus, specifically a tire changing apparatus, embodying the invention with parts shown in section for clarity;

FIG. 2 is a sectional view of a reciprocal air motor utilized in the tire servicing apparatus;

FIG. 3 illustrates the air motor in an early stage of partial assembly;

FIG. 4 illustrates the air motor in a subsequent stage of partial assembly; and

FIG. 5 is an end view of the air motor taken from the right of FIG. 2.

DESCRIPTION OF THE PREFERRED EMBODIMENT

With reference to FIG. 1, and exemplary embodiment of a tire servicing apparatus made according to the invention is illustrated in the form of a tire changing apparatus. However, it is to be understood that the invention is not limited to tire changing apparatus but may be advantageously employed in other types of tire servicing apparatus wherein motors are employed to drive parts of the apparatus relative to other parts as, for example, inflation devices wherein a wheel is clamped or drawn against a supporting surface.

The tire changing apparatus includes a base, generally designated 10, including a bottom plate 12 and an upstanding post 14. The upper end of the post 14 mounts a wheel receiving table 16 which includes the central, threaded post 18 on which the wheel may be impaled. Clamping means (not shown) cooperate with the threaded post 18 for holding the wheel firmly on the table 16.

The table 16 includes an elongated opening 20 in its upper surface through which extends a prong-like element 22 which may be introduced into a lug hole in the wheel to prevent the wheel from turning on the table. The prong-like element 22 is conventional in construction and is biased upwardly by a spring 24 in the usual fashion.

The post 14, at vertically spaced locations, pivotly mounts upper and lower pairs of arms 26 and 28 by means of pivots 30. The arms 26 and 28 are pivotably connected as at 32 and 34 to a bead breaker assembly, generally designated 36. As a consequence, a parallelogram linkage is formed by which the beak breaker assembly 36 may be moved towards and away from the table 16.

The bead breaker assembly 36 includes a vertically oriented channel 38, the upper end of which mounts a lower bead breaking shoe 40 by means of a pivot 42.

An outwardly extending box beam 44 is mounted on the channel 38 and includes a cross pin 46 which may selectively receive the lower end of an upper bead breaking shoe 48 at any one of a series of notches 50 therein. The upper bead breaking shoe 48 may be of conventional construction.

The upper end of the post 14, just below the table 16, mounts a sidewardly projecting plate 52 which, by means of a pin 54 pivotly mounts a yoke 56 secured to one end of a piston rod 58. The piston rod 58 is associated with an air cylinder 60 which is connected to the linkage by the pivot pin 34.

Turning now to FIGS. 2 and 5, construction of the air motor will be described in greater detail. The cylinder 60 includes an internal bore 62 which, in most instances, will have a diameter less than the length of the cylinder.

One end of the bore 62 is closed by a first closure 64 in the form of a circular plate which may be permanently affixed if desired as, for example, by welding.

The plate 64 includes a central bore 66 which receives a sleeve 68. The sleeve 68 includes interior packing 70 which slidably receives the piston rod 58.

The end of the piston rod 58 opposite from the pivot 58 is disposed within the cylinder 60 and is threaded as illustrated at 74. A piston 76 of any suitble material is located within the cylinder and is impaled upon the threaded end 74 of the rod 58 and retained in place by a nut 78. The piston 76 includes a peripheral groove 80 which receives an annular O-ring 82 to establish a seal between the piston 76 and the interior bore 62 of the cylinder 60.

The end of the cylinder 60 opposite the closure 64 is partially closed by pivot elements 84 which are located on opposite sides of the cylinder 60. Each pivot element 84 includes a leg 86 which extends axially of the cylinder 60 and has an aperture 88 therein for receipt of the pivot pin 34 (shown in dotted lines in FIG. 2). Each pivot element 80 also includes a leg 90 which extends partially radially inwardly of the cylinder 60 so as to partially close the associated end. It will be appreciated, however, that the end is partially open and the opening has a substantial width and a length equal to the diameter of the interior bore 62.

As best seen in FIG. 3, the piston 76 is made relatively narrow so that the same may be inserted through the opening endwise as indicated by an arrow 92 to be received within the cylinder 60. As soon as sufficient clearance is obtained, the piston 76 may be rotated 90° as illustrated by an arrow 94 to the dotted line position illustrated in FIG. 3. At this time, the piston rod 58 may be moved axially in the direction of an arrow 96 so that its threaded end 74 will pass through the piston to receive the nut 78.

The air motor also includes a closure 98 for the partially open end thereof. The closure 98 may be in the form of a circular plate having a diameter virtually equal to that of the interior bore 62. The plate 98 is provided with a peripheral groove 100 for receipt of an annular seal 102 which will sealingly engage the interior bore 62 of the cylinder 60.

Preferably, a retaining ring 104 is secured, as by welding, to one side of the plate 98.

As seen in FIG. 4, the plate 98 is introduced into the cylinder through the partial opening mentioned previously along the axis of the cylinder 60. As soon as sufficient clearance is obtained, the plate 98 may be rotated in the direction of an arrow 106 to a position 90° from that illustrated. The plate 98 may then be drawn rearwardly to abut the legs 90 of the pivot elements 84 and, if necessary, rotated so that the center of the retaining ring 104 is aligned with the apertures 88 and the pivot elements 84 for receipt of the pivot pin 34.

From the foregoing, it will be appreciated that expulsion of the closure plate 98 by air under pressure is resisted by the legs 90. At the same time, axial movement of the plate 98 towards the left as viewed in FIGS. 2-4 is substantially prevented by reason of the impaling of the retaining ring 104 by the pivot pin 34.

It will also be appreciated that initial fabrication of the assembly is considerably simplified when the procedure outlined above is followed. It will also be appreciated that when servicing of the cylinder is required, it is only necessary to remove the pivot pin 34 whereupon the abovedescribed procedure may be reversed to remove the plate 98 and the piston 76 and replace seals or the like. Thus, servicing may be accomplished easily and without a major disassembly of the apparatus.

An air cylinder made according to the invention may be employed either as a single or double-acting cylinder. Returning to FIG. 1, a valve 110 is suitably mounted on the base and includes a foot pedal actuator 112. A source of air under pressure is connected to the valve 110 and a conduit 114 extends from the valve 110 to the upper end of the cylinder 60. When the valve 110 is actuated to supply air under pressure to the conduit 114, the cylinder 60 will be elevated thereby elevating the lower bead breaking shoe 40 to break the lower bead of a tire and wheel received on the table. If the valve 110 is operated the other way, the air under pressure may be directed to the lower end of the cylinder 60 through a conduit 116 to lower the bead breaking assembly 36 to cause the upper bead breaking shoe 48 to engage the upper bead of the tire to break the same.

Where the cylinder is used as a single-acting cylinder, a spring may be introduced which provides a spring return. Alternately, a gravity return may be utilized.

I claim:

1. Tire changing apparatus comprising,
   a stand including a wheel receiving means for holding a wheel to permit tire changing operations to be performed on the wheel;
   a bead breaker assembly mounted for movement on said stand toward and away from said wheel receiving means; and
   a fluid motor interconnecting said stand and said assembly for moving said assembly at least toward said wheel receiving means, said motor including a cylinder having a closed end with a bore in said closed end, said cylinder being partially closed at its opposite end while being open across at least one diameter, a rod extending through said bore, a piston removably secured to said rod within said cylinder, and a closing member for said opposite end removably received in said opposite end.

2. The tire changing apparatus of claim 1 wherein said closing member comprised a circular plate provided with a peripheral seal.

3. The tire changing apparatus of claim 1 wherein said opposite end is partially closed by opposed pivots having posts extending partially radially inwardly of said opposite end.

4. The tire changing apparatus of claim 3 wherein said opposed pivots are spaced a distance greater than the larger of the thickness of the piston and the closing member.

5. Tire changing apparatus comprising;
   a stand having a base;
   a wheel receiving table mounted on said base;
   a bead breaker shoe moveable toward and away from said table;
   a linkage movably connected to said shoe and to said base;
   a cylinder having an interior bore of a diameter less than the cylinder length;
   a piston rod;
   a piston rod receiving first closure closing one end of said cylinder, said rod being slidable within said first closure;
   opposed elements defining a pivot mounted on the other end of said cylinder to partial close the same while leaving an opening of substantial width and a length equal to said diameter;

a piston received in said cylinder through said opening and removably secured to said rod;

a second closure received in said cylinder through said opening and closing the same, said second closure abutting said opposed elements;

a pivot pin extending between said opposed elements and pivotally securing said cylinder to one of said linkage and said base; and a pivot securing said rod to the other of said linkage and said base.

6. The tire changing apparatus of claim 5 further including a retaining ring on one side of said second closure and extending through said opening and impaled by said pivot pin.

7. The tire changing apparatus of claim 5 wherein said second closure comprised a circular plate, a peripheral groove in said plate, and an annular seal in said groove and sealing by engaging said interior bore.

8. Tire servicing apparatus comprising, a base;

wheel receiving means on said base for receiving a wheel mounting a tire to be serviced;

tire servicing means movable on said base for performing a desired function in a tire servicing operation; and a fluid motor on said base for driving said tire servicing means including a cylinder having a partial opening at one end of substantial width and a length equal to its internal diameter, a piston within said cylinder and removable through said opening, and a closure with said cylinder and removable through said opening.

* * * * *